J. MAYNE.
APPARATUS FOR LOADING CARS.
APPLICATION FILED JULY 25, 1917.

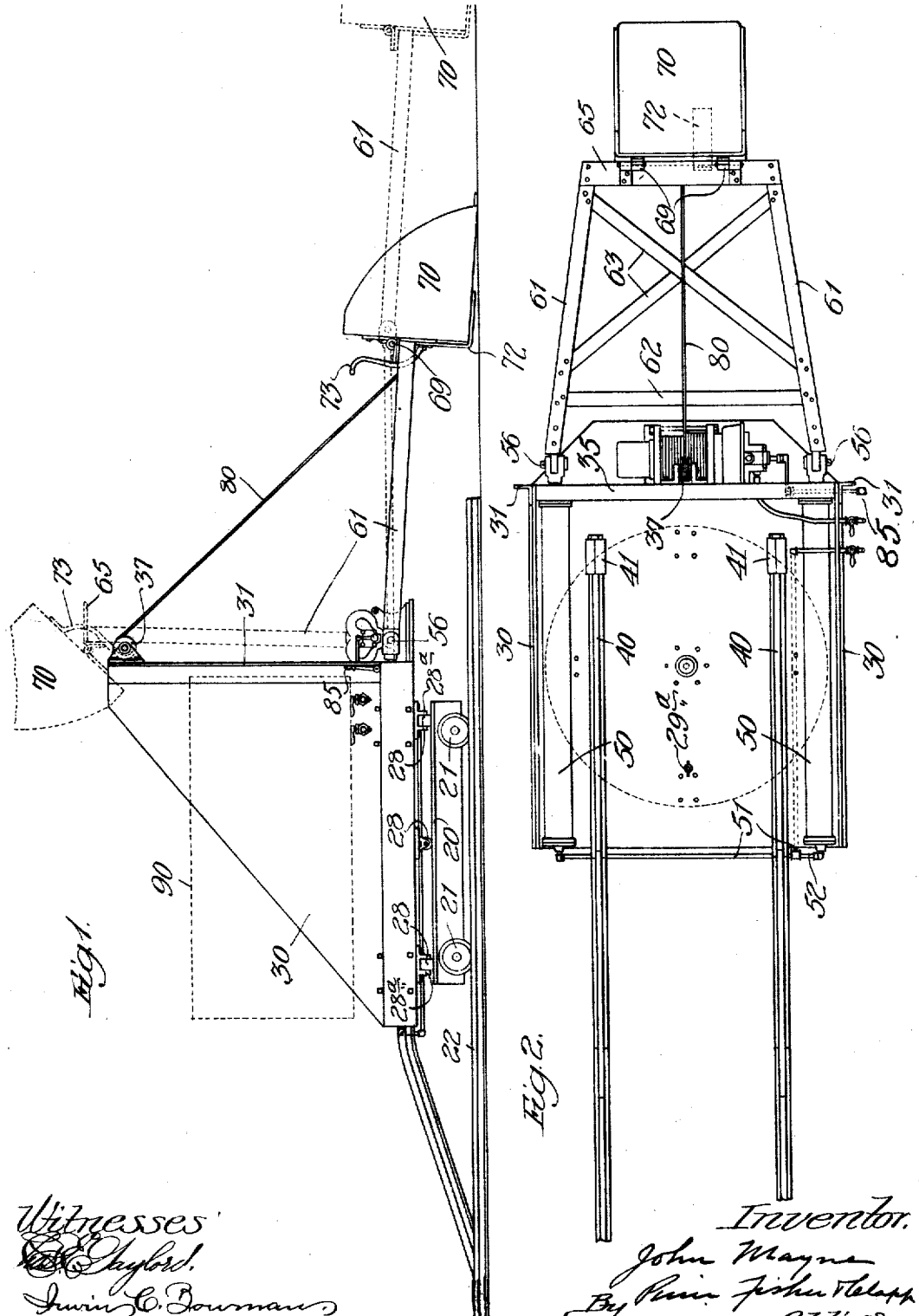

1,366,201.

Patented Jan. 18, 1921.
3 SHEETS—SHEET 2.

Witnesses:

Inventor.
John Mayne

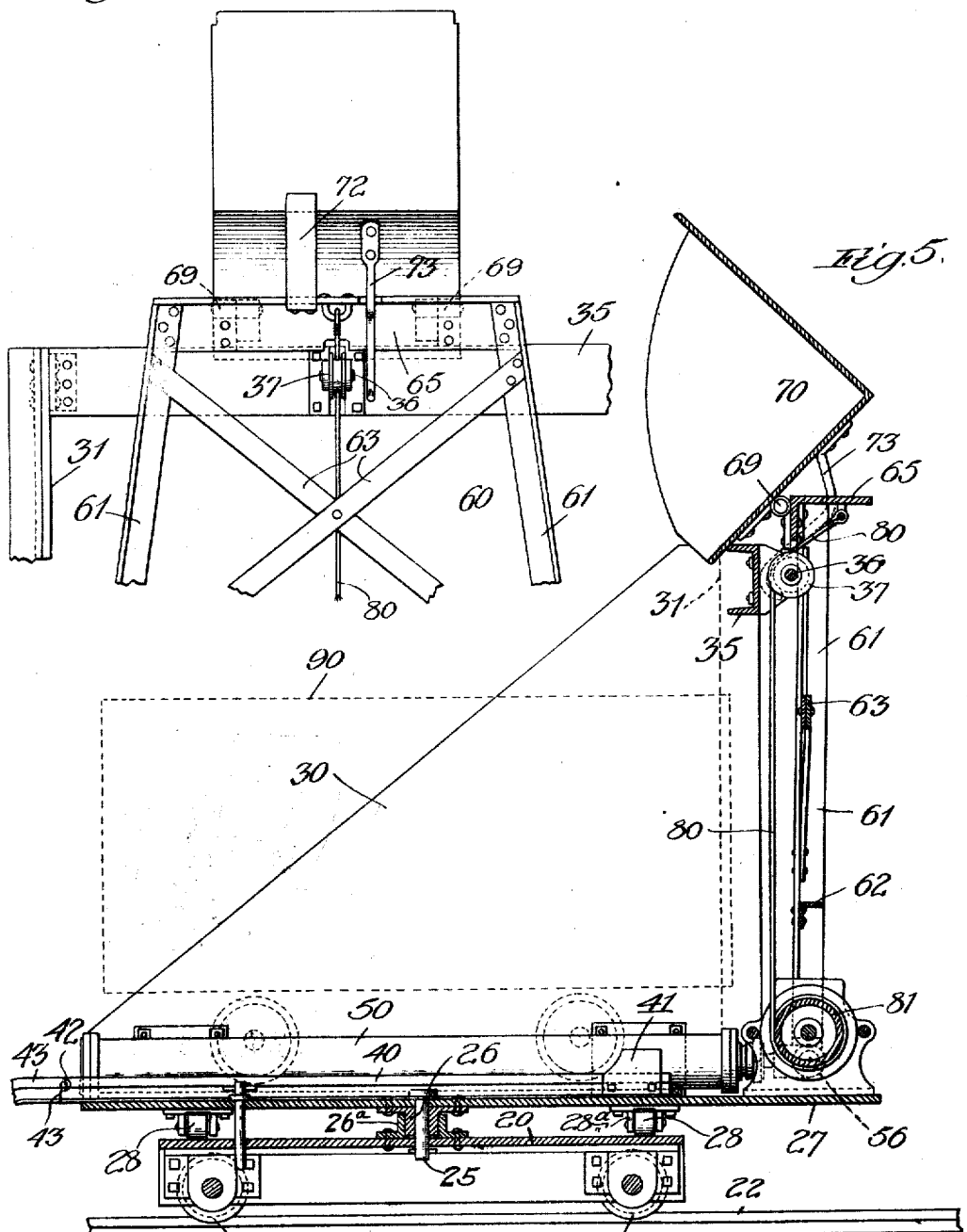

UNITED STATES PATENT OFFICE.

JOHN MAYNE, OF NEGAUNEE, MICHIGAN, ASSIGNOR OF ONE-SIXTH TO STUART R. ELLIOTT AND ONE-SIXTH TO ORA D. McCLURE, BOTH OF ISHPEMING, MICHIGAN, AND ONE-SIXTH TO JAMES H. ROUGH, ONE-SIXTH TO W. FRED WARE, AND ONE-SIXTH TO GEORGE R. JACKSON, ALL OF NEGAUNEE, MICHIGAN.

APPARATUS FOR LOADING CARS.

1,366,201.   Specification of Letters Patent.   Patented Jan. 18, 1921.

Application filed July 25, 1917. Serial No. 182,602.

*To all whom it may concern:*

Be it known that I, JOHN MAYNE, a citizen of the United States, residing at Negaunee, county of Marquette, and State of Michigan, have invented certain new and useful Improvements in Apparatus for Loading Cars, of which I do declare the following to be a full, clear, and exact description, reference being had to the accompanying drawings, forming part of this specification.

The present invention has for its object to provide a simple and effective apparatus which, while susceptible of more general use, is particularly well adapted for the loading of ore cars in the tunnels of mines and like situations. The invention consists in the features of novelty hereinafter described, illustrated in the accompanying drawings and particularly pointed out in the claims at the end of this specification.

Figure 3:
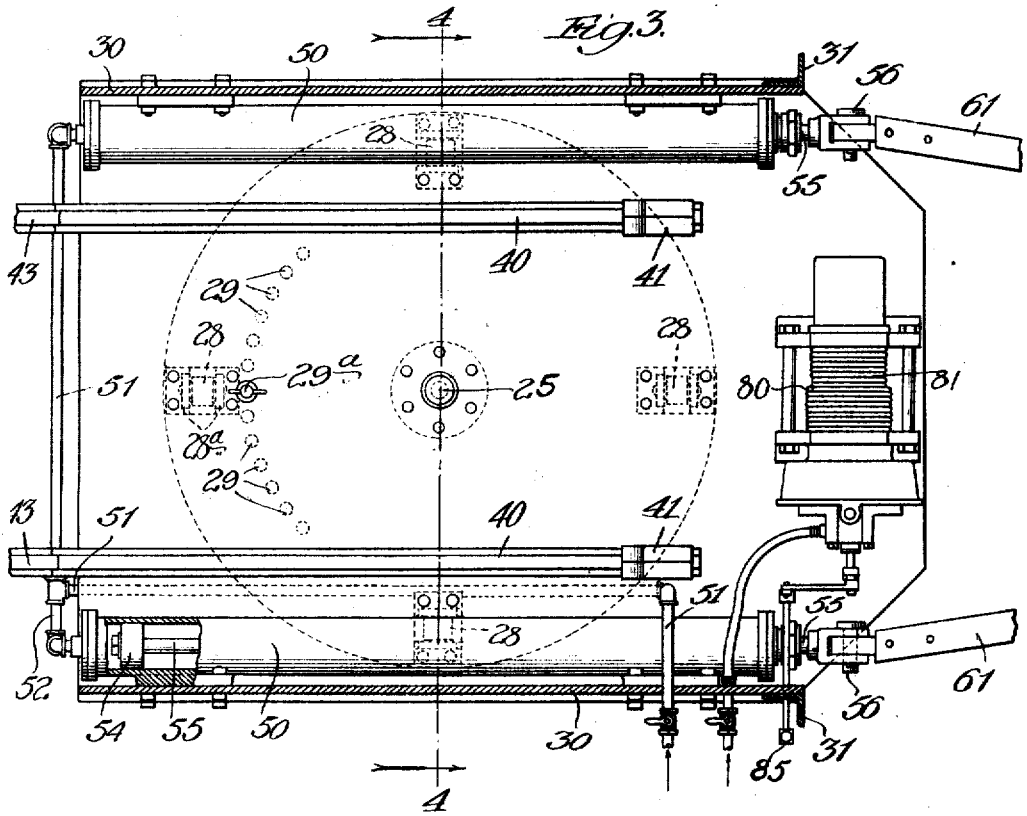
Figure 4:
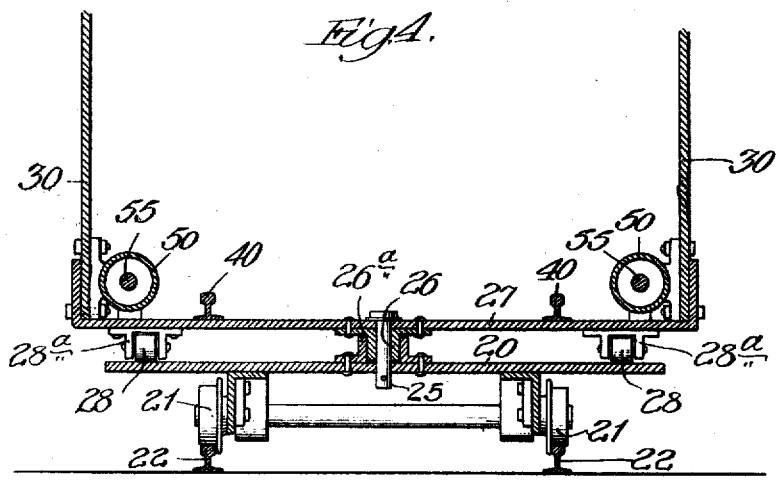

Figure 1 is a view in side elevation of an apparatus embodying my invention. Fig. 2 is a plan view. Fig. 3 is a view partly in plan and partly in section upon an enlarged scale. Fig. 4 is a view in vertical section on line 4—4 of Fig. 3. Fig. 5 is a view in central longitudinal vertical section showing the shovel in elevated position. Fig. 6 is a detail front view of the shovel and the upper portion of the shovel carrying arm and adjacent parts.

In the preferred form of my invention illustrated in the accompanying drawings, the apparatus comprises a platform 20 suitably mounted upon wheels 21 adapted to travel upon the rails 22 of the track leading into the tunnel and to the point at which the loading of the cars is to be effected. Upon the truck or platform 20 is pivotally mounted the body portion of the apparatus, this pivotal mounting of the body portion being preferably effected by a king pin 25 passing through center bearing sleeves 26 and 26ª bolted respectively to the floor 27 of the body portion and to the platform 20 (see Figs. 4 and 5). As shown, anti-friction rollers 28 held in suitably formed brackets 28ª are secured to the under side of the floor 27 of the apparatus, to enable the body portion to be freely swung as a turntable around the pin 25 as a center. In order to hold the body portion of the apparatus in different positions when it is swung upon the platform, the platform is preferably provided with a series of holes 29 to receive a pin 29ª that passes through a hole formed in the floor 27 of the body portion.

The body portion of the apparatus may be formed of a lower metal plate or floor 27 having upturned flanges at its sides, to which flanges are suitably secured vertical side plates 30. Preferably, these side plates are braced at their forward ends by the standards 31 that may be of angle bar, and additional braces may be used if desired. Between the upper ends of the side plates 30 extends a cross bar 35 (that is shown as a channel bar) on which is mounted a short shaft 36 carrying a pulley 37, the function of which will presently appear.

Upon the floor 27 of the body portion of the apparatus is mounted a pair of rails 40 that will be arranged at a distance apart corresponding to the gage or distance between the rails 22. Preferably, the front ends of the rails 40 will be provided with stop blocks 41, and to the rear ends of the rails 40 are pivotally connected, as at 42, extensions 43 adapted to turn down onto and coincide with the rails 22. The pivotal ends of the extensions 43 are preferably formed with shoulders 45 to limit the downward movement of these rail ends, so that as the body of the apparatus is turned laterally, as hereinafter described, the pivoted rail ends 43 can swing slightly above or clear of the rails 22, these pivoted rail ends 43 being adapted to turn back on the floor 27 of the apparatus when the apparatus is to be moved from point to point.

The rear end of the platform 20 will be provided with suitable spuds to prevent the backward movement of the apparatus when in operation, but as these spuds form no part of my invention, I have not deemed it necessary to illustrate them in the accompanying drawings.

Upon the body portion of the apparatus are suitably mounted the compressed air cylinders 50 to the rear ends of which are connected the pipes 51 and 52 by which compressed air from a suitable source of supply will be admitted to the cylinders, The pipe 51 may be led to the side of the apparatus as shown and will be provided with a controlling valve whereby the admission and exhaust of compressed air to and from the cylinders can be conveniently effected. Within the cylinders 50 are mounted the pistons 54 from which extend the piston rods 55, the outer ends of these rods being pivotally connected, as at 56, to the rear end of the shovel arm 60. This shovel arm 60 is preferably formed of side bars 61 suitably braced by the bars 62 and 63, the outer ends of these side bars being connected by a cross head 65 that carries the shovel or scoop 70. This shovel or scoop 70 is preferably of the shape shown and its back plate is hinged, as at 69, to the cross head 65 of the shovel arm. To this cross head 65 is rigidly secured a bar 72 the forwardly projecting portion of which is adapted to extend beneath the bottom of the shovel or scoop 70. To the rear portion of the shovel or scoop 70 is secured a dumping arm 73 that extends rearwardly and upwardly, as clearly shown in Fig. 5, and is adapted to contact with the cross bar 35 whereon the pulley 37 is mounted.

To the cross head 65 of the shovel arm 60 is attached one end of a cable 80 that leads rearwardly up over the pulley 37 and downwardly to the winding drum 81 of a hoist that is mounted upon the forwardly extending portion of the floor 27 of the apparatus. Any suitable type of hoist may be used for operating the cable 80 and I have shown one common form of mine hoist that is operated by compressed air. A hand lever 85, whereby is effected the admission and exhaust of compressed air to the cylinders of the hoist, is arranged in convenient position to be operated by the attendant standing at one side of the apparatus.

From the foregoing description, the operation of my improved apparatus will be seen to be as follows: Assuming that an ore car 90 (shown by dotted lines in Fig. 5) is pushed from the main track onto the rails 40, that the shovel or scoop is in the lowered or retracted position shown by full lines in Fig. 1, the operator will admit air to the cylinders 50, causing the piston rods of these cylinders to move outward the shovel arm (as shown by dotted lines) and force it into the pile of ore in front of it. When the shovel is loaded, the controlling valve for the air cylinders 50 will be turned to exhaust position, and by the operation of the hand lever 85 air will be admitted to the cylinder of the hoist so as to cause the winding drum 81 to wind up the cable 80. As the cable 80 is wound upon the winding drum 81, it will first draw inward the piston rods 55 to the retracted position shown in Fig. 1 of the drawings, after which the continued winding of the cable 80 will lift the shovel arm and shovel (as shown by dotted lines Fig. 1) until the dumping arm 73 attached to the back end of the shovel contacts with the cross bar 35, thereby causing the shovel to tip about its pivot points 69 and discharge its load into the car 90. By varying the speed of the hoisting cable, the load of the shovel may be dumped at any desired point within the car 90, and thus the load in the car may be uniformly distributed.

Inasmuch as mining tunnels are usually of small area (ordinarily about 8 feet in diameter), it is desirable when the apparatus is employed for this purpose, that the shovel arm shall be comparatively short so that as it is swung upward to dump the shovel load into the car, the shovel will not contact with the top of the tunnel, and by attaching the shovel arm to the outer ends of the piston rods, the initial retraction of the piston rods allows the shovel arm to be drawn inward before the shovel is lifted to dump its load. When the shovel is to take the ore from either side of the pile at the end of the tunnel, the body portion of the apparatus can be swung laterally upon the platform and by means of the pin 29$^a$ can be held in the desired position. When the car 90 has received its load, the body portion of the apparatus will be brought to normal position so that the rails 40 will aline with the rails 22, after which the loaded car 90 may be drawn away.

What I claim as new and desire to secure by Letters Patent, is:—

1. An apparatus of the character described, comprising a truck or platform, a fluid pressure cylinder mounted upon and extending lengthwise thereof, a piston rod extending forwardly from the front of said cylinder, a shovel arm pivoted to the front end of said piston rod, a shovel mounted on said arm, means for admitting fluid under pressure to said cylinder to move said arm and shovel forwardly to scoop up material and means on said truck or platform withdrawing said piston rod and shovel arm and subsequently raising the latter, raising said pivoted shovel arm upwardly and rearwardly to dump the load of the shovel.

2. An apparatus of the character described, comprising a truck or platform, a fluid pressure cylinder mounted horizontally thereon, a piston rod extending forwardly from the front end of said cylinder, a shovel arm pivotally connected at its inner end to the front end of said piston rod, a shovel mounted on the outer end of said arm, means for admitting fluid under pressure to said cylinder to move said piston rod, arm and shovel forwardly to scoop up material, and a winding drum and cable for withdrawing said parts and subsequently raising said pivoted shovel arm upwardly and rearwardly to dump the load of the shovel.

3. An apparatus of the character described, comprising a truck or platform, fluid pressure cylinders extending longitudinally of said platform, piston rods projecting forwardly from said cylinders, a shovel carrying arm pivotally connected to the forward ends of said piston rods, a shovel mounted on the outer end of said shovel carrying arm, means for admitting fluid under pressure to said cylinders to move said arm and shovel forwardly to scoop up material and means carried by said truck or platform for withdrawing said piston rods, arm and shovel and subsequently swinging the shovel arm upwardly and rearwardly to dump the load.

4. An apparatus of the character described, comprising a wheel supported truck, means whereby a car to be loaded may pass onto said truck, a vertically movable shovel-carrying arm mounted at the front end of said truck, said arm projecting to a distance in front of the truck and having a shovel mounted upon its outer free end, and means carried by said truck whereby the shovel-carrying arm can be raised upwardly and rearwardly to lift the shovel from a point in front of said truck to a point above said truck in position to dump the shovel load into said car when the latter is in position on the truck.

5. An apparatus of the character described, comprising a truck adapted to admit at one end a car to be loaded, a reciprocatory loading shovel projecting to a distance in front of the opposite end of said truck, and means carried by said truck for thrusting said shovel forwardly beyond the end of the truck to receive its load and for retracting and lifting said shovel to a position above the car to be loaded and for dumping said shovel into said car.

6. An apparatus of the character described, comprising a truck, rails supported thereby for sustaining a car to be loaded, said rails having downwardly extending portions at the rear end of said truck for receiving said car from the main track, loading mechanism comprising a pivoted, reciprocatory shovel-carrying arm projecting to a distance in front of the front end of said truck, and means for reciprocating said shovel-carrying arm to load the shovel and for lifting said shovel-carrying arm to a point above the truck to discharge the shovel load into said car.

7. An apparatus of the character described, comprising a wheel supported truck or platform, a frame or body pivotally mounted thereon, rails supported by said frame or body for sustaining a car to be loaded, loading mechanism carried by said frame or body and arranged to deliver material into the car when in position on said rails, and means for actuating said loading mechanism.

8. An apparatus of the character described, comprising a truck or platform, a frame or body pivotally mounted thereon and provided with rails for sustaining a car to be loaded, loading mechanism mounted at the front end of said frame or body and arranged to deliver material upwardly and rearwardly into the car when in position on said rails, and means for actuating said loading mechanism.

9. An apparatus of the character described, comprising a truck or platform, a frame or body pivotally mounted thereon and provided with rails for sustaining a car to be loaded, loading mechanism carried by said truck or platform and arranged to deliver material into the car when in position on said rails, means for actuating said loading mechanism, and means for holding said frame or body in different positions with respect to said truck or platform.

10. An apparatus of the character described, comprising a truck or platform provided with means for sustaining a car to be loaded, a fluid pressure cylinder supported by said truck or platform, a piston rod for said cylinder extending forwardly therefrom, a shovel carrying arm pivotally connected at its rear end to said piston rod, a hoisting cable connected to the outer end of said shovel carrying arm, and a winding drum for actuating said hoisting cable to move upwardly and rearwardly said shovel carrying arm.

11. An apparatus of the character described, comprising a truck or platform for sustaining a car to be loaded, a shovel carrying arm, and means for actuating the same supported by said truck or platform, a shovel pivotally mounted at the end of said shovel carrying arm, means for raising said shovel carrying arm, and means for tipping said shovel to discharge its load.

12. An apparatus of the character described, comprising a truck or platform for sustaining a car to be loaded, a fluid pressure cylinder carried by said truck or platform, a piston rod extending forwardly from said cylinder, a shovel carrying arm pivotally connected to said piston rod, a shovel pivotally mounted upon the end of said shovel carrying arm, a dumping arm connected to said shovel, and a part elevated above said truck or platform with which said dumping arm will contact in order to tip the shovel, and means for swinging upwardly and rearwardly said pivoted shovel carrying arm.

JOHN MAYNE.